Inventor:
Hermann Müllensiefen

Inventor:
Hermann Müllensiefen

UNITED STATES PATENT OFFICE

HERMANN MÜLLENSIEFEN, OF WITTEN-CRENGELDANZ, GERMANY

APPARATUS FOR MANUFACTURING SHEET GLASS

Application filed July 13, 1929, Serial No. 378,082, and in Germany July 18, 1928.

My invention relates to improvements in apparatus for manufacturing sheet glass, and more particularly in apparatus of the type in which the sheet glass is drawn from the body of molten glass through a slit made in a body floating on the surface of the glass. The object of the improvements is to provide an apparatus by means of which wire glass can be manufactured, and with this object in view my invention consists in providing the floating body with bores disposed transversely of the slot for passing wires into the glass being drawn upwardly through the said slot. Preferably, the said bores are disposed so that the angle included between the same and the band of glass drawn upwardly is obtuse, so that the wires can be readily passed into the glass.

Figure 4:
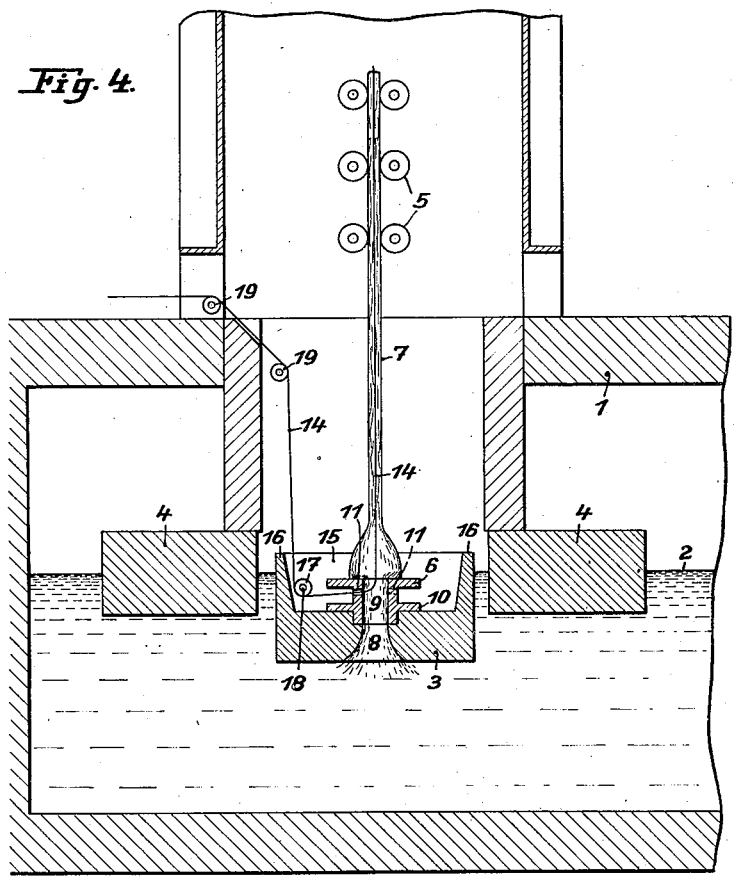
Figure 5:
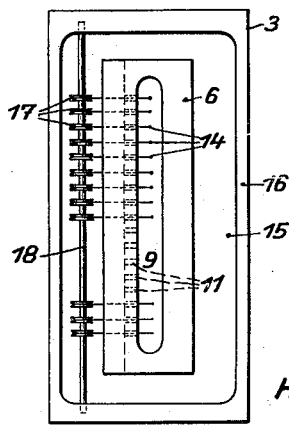

For the purpose of explaining the invention two examples embodying the same have been shown in the accompanying drawing in which the same reference characters have been used in all the views to indicate corresponding parts. In said drawings, Fig. 1 is a sectional elevation showing an oven and the apparatus for drawing a band of glass from the glass contained within the oven, Fig. 2 is a top plan view showing the floating body formed with a slot for drawing the glass therethrough and pipes for directing the wires to the transverse bores of the said body, Fig. 3 is a sectional elevation on an enlarged scale showing the slotted mouth piece of the floating body, Fig. 4 is a sectional elevation similar to the one illustrated in Fig. 1 and showing a modification of the floating body, and Fig. 5 is a top plan view of the floating body.

On the surface of the body of molten glass 2 contained within an oven 1 there is a floating body 3 of refractory material such as chamotte, the said body being held in a certain position below a set of glass drawing rollers 5 by means of transverse walls 4. The bottom of the floating body is formed with an elongated hole 8, and in the said hole a mouth piece 6 is fitted which is likewise formed with an elongated slot 9, the said mouth piece consisting of a suitable metal adapted to withstand high temperature. Between the bottom of the body 3 and the mouth piece 6 there is a packing of asbestos 10. In the operation of the apparatus a band of glass is drawn by means of the rollers 5 through the slots 8 and 9, as is known in the art.

Figure 1:
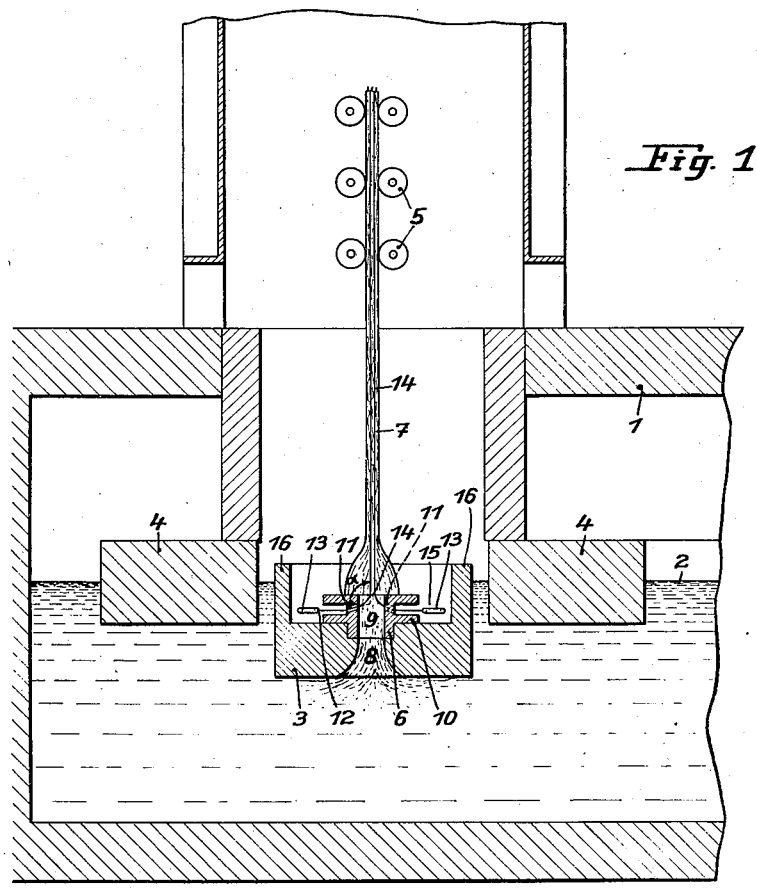
Figure 2:
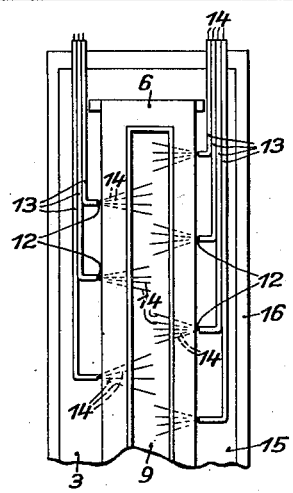
Figure 3:
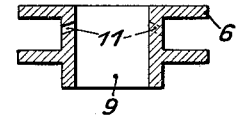

In the construction shown in Figs. 1 to 3 the top part of the mouth piece 6 is formed at both longitudinal sides with transverse bores 11, and in the example shown in Fig. 2 the bores are arranged in sets of four bores, the sets of the opposite sides of the slot being displaced with relation to each other. As viewed in a vertical sectional plane, the angle $\alpha$ included between the bores 11 and the glass band 7 is obtuse, and the bores 11 of each set are disposed angularly of each other and so that their axes intersect one another at points 12 located outside the mouth piece 6, the wires of each set being supplied through pipes 13 ending in the said points and located above the bottom of the body 3. The wires 14 are supplied to the pipes 13 from rolls disposed in a chamber separate from the oven, and the pipes are located parallel to each other in longitudinal chambers 15 bounded by side walls 16 rising from the bottom 3 of the float.

At the beginning of the operation the wires 14 to be embedded in the glass 7 are passed through the bores 11 of the mouth piece 6 and fixed to a bait bar passed into the slot 9 and adapted to be immersed into the body of glass 2 for starting the drawing operation. Preferably the said wires 14 are fixed to the bait bar by means of iron rods or the like, one rod being provided for the sets of wires coming from each side of the slot 9. The rods are secured to opposite sides of the bait bar for example by being placed on hooks, and they are moved upwardly with the bait bar carrying along the wires.

The mouth piece 6 and the pipes 13 are placed into the float 3 shortly before the drawing operation begins, in order that the said mouth piece and the pipes be not exposed to the high temperature needed for heating the oven.

The wires 14 are pulled upwardly from the ends 12 of the bores 11 and into the slot 9 together with the band of glass 7 pulled upwardy from the metallic mouth piece 6 while forming a body similar to an onion. The wires 14 are embedded in the band of glass thus producing a sheet of wire glass which as far as the properties of the glass are concerned has the advantages of sheet glass manufactured by drawing.

By disposing the bores 11 at obtuse angles relatively to the band 7 of glass the wires can be readily passed into the glass, and sharp bents of the wires are avoided.

If desired the bores 11 are distributed over the whole circumference of the mouth piece 6.

The modification shown in Figs. 4 and 5 is distinguished from the example so far described in that a rod 18 is disposed in one of the chambers 15 of the float 3, which rod is parallel to the slot 9, and which is provided with rollers 17 corresponding each to a transverse bore 14 made in the mouth piece 6. The said rolls 17 provide guides for the wires 14 supplied to the rolls by means of similar rolls 19, 19 rotatably supported on the wall of the oven. The wires are pulled upwardly from the inner ends of the bores and into the slot 9 together with the glass band. In the modification shown in Figs. 4 and 5 the bores are perpendicular to the slot 9 when seen in plan view.

I claim:

1. An apparatus for manufacturing sheet glass, comprising a body formed with an elongated slot and adapted to float on the body of glass, said body being formed with bores disposed transversely of said slot, means for drawing a band of glass through said slot, means for supplying wires through said bores and into the band of glass, and means for preventing access of the molten glass to the wires being supplied to said bores.

2. An apparatus for manufacturing sheet glass, comprising a body adapted to float on the body of glass, a mouth piece removably mounted on the bottom of said body, said bottom and body being formed with registering slots, said mouth piece being formed with bores disposed transversely of said slot, means for drawing a band of glass through said slot, means for supplying wires through said bores and into the band of glass, and means for preventing access of the molten glass to the wires being supplied to said bores.

3. An apparatus for manufacturing sheet glass, comprising a body formed with an elongated slot and adapted to float on the body of glass, said body being formed with bores disposed transversely of said slot and including with the band being drawn through the slot an obtuse angle, means for drawing a band of glass through said slot, means for supplying wires through said bores and into the band of glass, and means for preventing access of the molten glass to the wires being supplied to said bores.

4. An apparatus for manufacturing sheet glass, comprising a body formed with an elongated slot and adapted to float on the body of glass, said body being formed at both longitudinal sides with bores disposed transversely of said slot, means for drawing a band of glass through said slot, means for supplying wires through said bores and into the band of glass, and means for preventing access of the molten glass to the wires being supplied to said bores.

5. An apparatus for manufacturing sheet glass, comprising a body formed with an elongated slot and adapted to float on the body of glass, said body being formed at both longitudinal sides with bores disposed transversely of said slot, means for drawing a band of glass through said slot, means for supplying wires through said bores and into the band of glass, and means for preventing access of the molten glass to the wires being supplied to said bores, said bores being combined into sets of a plurality of bores displaced with relation to each other at opposite sides of the slot.

In testimony whereof, I have signed this specification.

HERMANN MÜLLENSIEFEN.